US011852221B2

(12) United States Patent
Chiang

(10) Patent No.: US 11,852,221 B2
(45) Date of Patent: Dec. 26, 2023

(54) PLANETARY GEAR ASSEMBLY

(71) Applicant: REXON INDUSTRIAL CORP., LTD., Taichung (TW)

(72) Inventor: Hung-Jung Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 18/181,294

(22) Filed: Mar. 9, 2023

(65) Prior Publication Data

US 2023/0296161 A1 Sep. 21, 2023

(30) Foreign Application Priority Data

Mar. 18, 2022 (TW) .................................. 111110132

(51) Int. Cl.
*F16H 3/62* (2006.01)
*F16H 1/32* (2006.01)
*B60K 17/04* (2006.01)
*F16H 1/28* (2006.01)

(52) U.S. Cl.
CPC ................. *F16H 3/62* (2013.01); *F16H 1/32* (2013.01); *B60K 17/046* (2013.01); *F16H 2001/2881* (2013.01)

(58) Field of Classification Search
CPC .... F16H 3/62; F16H 57/08; F16H 2001/2881; B60K 17/046
USPC .......................................................... 475/342
See application file for complete search history.

(56) References Cited

U.S. PATENT DOCUMENTS

| 3,421,596 A | * | 1/1969 | Livezey | .................. F16H 47/08 180/65.245 |
| 3,686,978 A | * | 8/1972 | Knoblach | ............... F16H 3/001 475/296 |
| 3,792,629 A | * | 2/1974 | Applebury | ................ F16H 1/46 475/342 |

(Continued)

FOREIGN PATENT DOCUMENTS

| CN | 102711704 A | * | 10/2012 | ............. A61G 5/023 |
| CN | 202923823 U | | 5/2013 | |
| TW | 202200917 A | | 1/2022 | |

OTHER PUBLICATIONS

Search Report issued in Taiwanese patent application No. 111110132, dated Nov. 4, 2022.

*Primary Examiner* — Sherry L Estremsky
(74) *Attorney, Agent, or Firm* — Birch, Stewart, Kolasch & Birch, LLP

(57) ABSTRACT

A planetary gear assembly includes a wheel hub surrounding an axis, and having an end face and a plurality of engaging recesses formed in the end face, and a planetary gear reduce mechanism including a sun gear disposed on and rotatable about the axis, a plurality of planet gears, and first and second ring gears. The planet gears angularly surround the sun gear and mesh with the sun gear and the first and second ring gears. The first ring gear is stationary relative to the planet gears. The second ring gear is arranged between the wheel hub and the first ring gear along the axis. The second ring gear includes a wheel-hub-facing face surrounding the axis and facing the end face, and a plurality of joining protrusions disposed on the wheel-hub-facing face and respectively complementary in shape with and respectively engage the engaging recesses.

5 Claims, 7 Drawing Sheets

(56) References Cited

U.S. PATENT DOCUMENTS 4,040,312 A * 8/1977 Tappan ................... F16H 47/04
                                                      475/342
6,080,077 A * 6/2000 Kamlukin ............. F16H 57/082
                                                      180/372

* cited by examiner

PLANETARY GEAR ASSEMBLY

CROSS-REFERENCE TO RELATED APPLICATION

This application claims priority to Taiwanese Invention Patent Application No. 111110132, filed on Mar. 18, 2022.

FIELD

The disclosure relates to a reducer mechanism, and more particularly to a planetary gear assembly.

BACKGROUND

Referring to FIG. 1, a conventional planetary gear assembly includes a wheel hub 1, a spur gear 101, and a ring gear 2. The spur gear 101 is disposed on an end face of the wheel hub 1, and includes a plurality of outer teeth 102. The ring gear 2 includes an inner annular surface 201 and a plurality of inward-facing teeth 202 arranged on the inner annular surface 201 and meshing with the outer teeth 102 of the spur gear 101 so as to position the hub 1 relative to the ring gear 2.

The planetary gear assembly further includes a sun gear (not shown), a plurality of planetary gears (not shown) disposed around and meshing with the sun gear and the planetary gears, an outer ring gear (not shown) surrounding and meshing with the planetary gears, and an end cap (not shown) connected fixedly to the outer ring gear and immovable relative to the wheel hub 1.

The sun gear drives the planetary gears to rotate when being rotated by an external force, so the planetary gears rotate relative to the sun gear, revolve along the outer ring gear, and drive the ring gear 2 to rotate. Then, the ring gear 2 drives rotation of the wheel hub 1 through connection among the inward-facing teeth 202 and the outer teeth 102.

Although the abovementioned structure is capable of reducing rotational speed of the sun gear, there are still some shortcomings to be resolved.

First, in order to facilitate assembly of the conventional planetary gear assembly, the outer teeth 102 and the inward-facing teeth 202 are manufactured such that gaps are formed thereamong after assembly. However, such configuration may result in noises during operation of the conventional planetary gear assembly, and the outer teeth 102 and the inward-facing teeth 202 may be worn out after a period of use.

Second, it is relatively difficult to manufacture a wheel hub 1 with the spur gear 101 disposed thereon.

SUMMARY

Therefore, an object of the disclosure is to provide a planetary gear assembly that can alleviate at least one of the drawbacks of the prior art. According to the disclosure, a planetary gear assembly including a wheel hub and a planetary gear reduce mechanism is provided. The wheel hub surrounds an axis, and has an end face and a plurality of engaging recesses formed in the end face. The planetary gear reducer mechanism includes a sun gear, a plurality of planet gears, a first ring gear, and a second ring gear. The sun gear is disposed on and rotatable about the axis. The planet gears surround the sun gear, are angularly spaced apart from each other, and mesh with the sun gear. The first ring gear is stationary relative to and meshes with the planet gears, and includes a first inner surface that surrounds the axis and a plurality of first inward-facing teeth that are arranged on the first inner surface and that engage teeth of the planetary gears. The second ring gear is arranged between the wheel hub and the first ring gear along the axis and meshes with the planet gears. The second ring gear includes a second inner surface, a plurality of second inward-facing teeth, a wheel-hub-facing face, and a plurality of joining protrusions. The second inner surface surrounds the axis. The second inward-facing teeth are arranged on the second inner surface and engage the teeth of the planet gears. The wheel-hub-facing face is transverse to the second inner surface, surrounds the axis, and faces the end face of the wheel hub. The joining protrusions are disposed on the wheel-hub-facing face, and are respectively complementary in shape with and respectively engage the engaging recesses.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
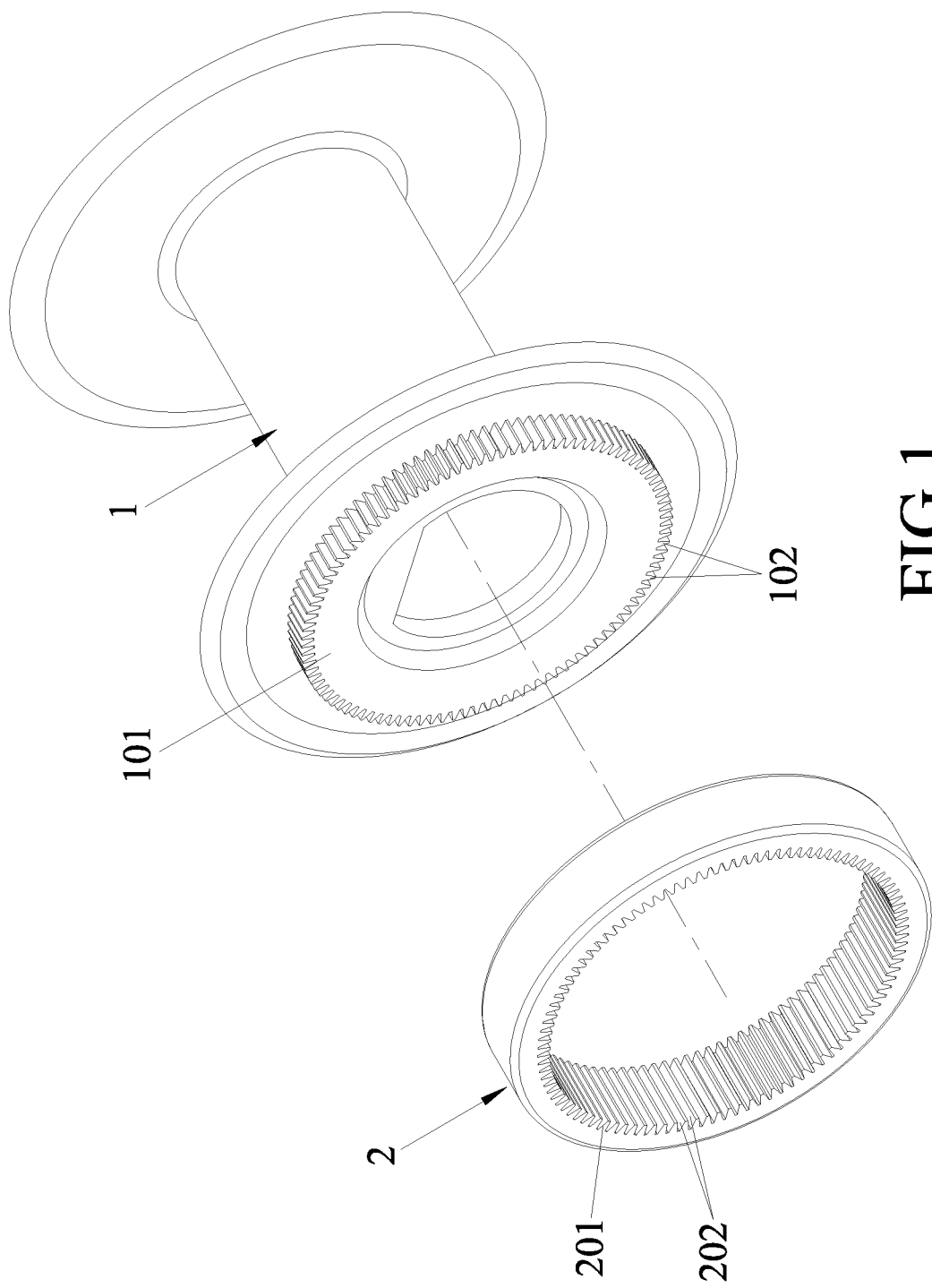
FIG. 1 is an exploded perspective view of a conventional planetary gear assembly.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 2:
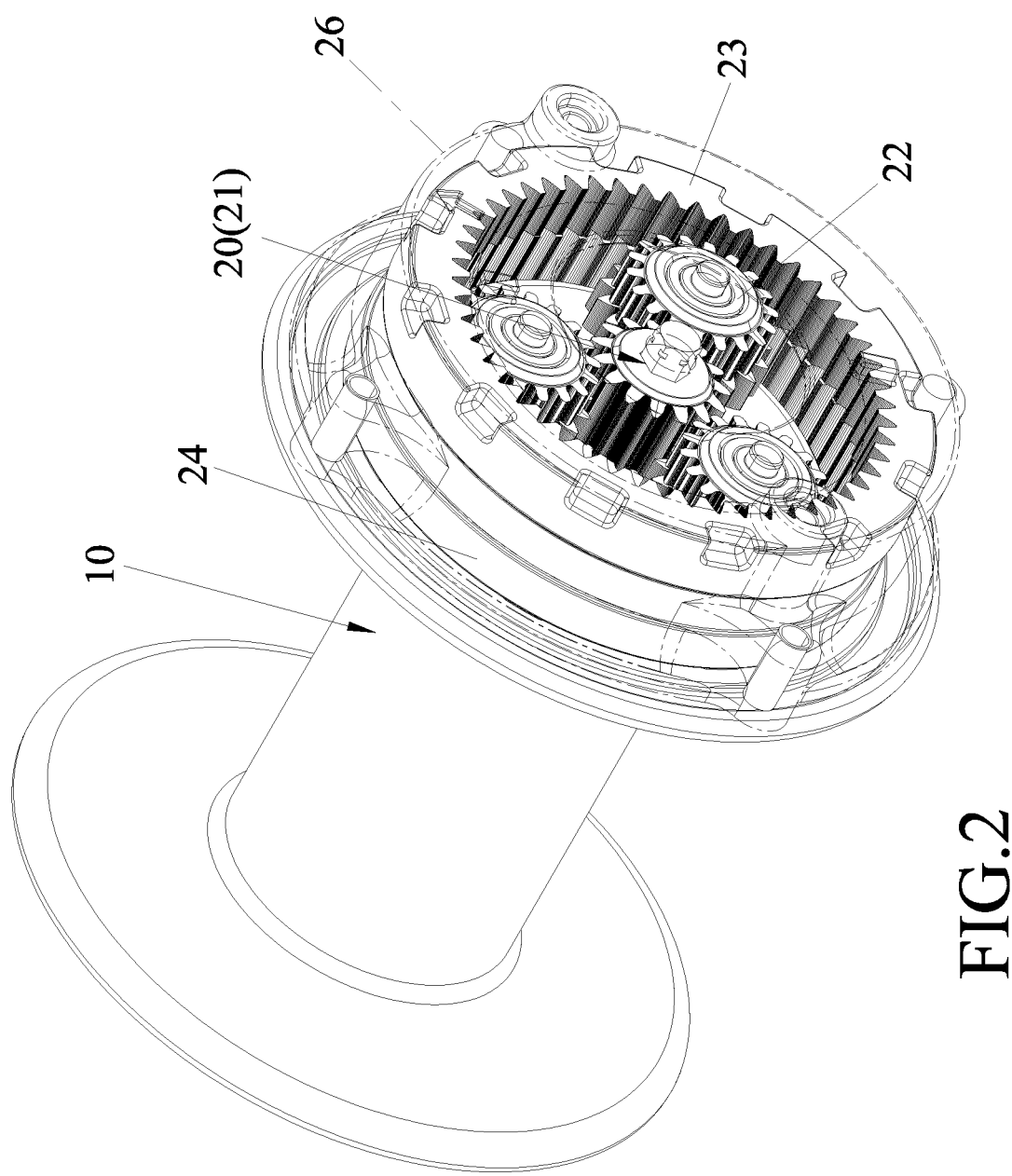
FIG. 2 is a perspective view of a planetary gear assembly according to an embodiment of the present disclosure.
Figure 3:
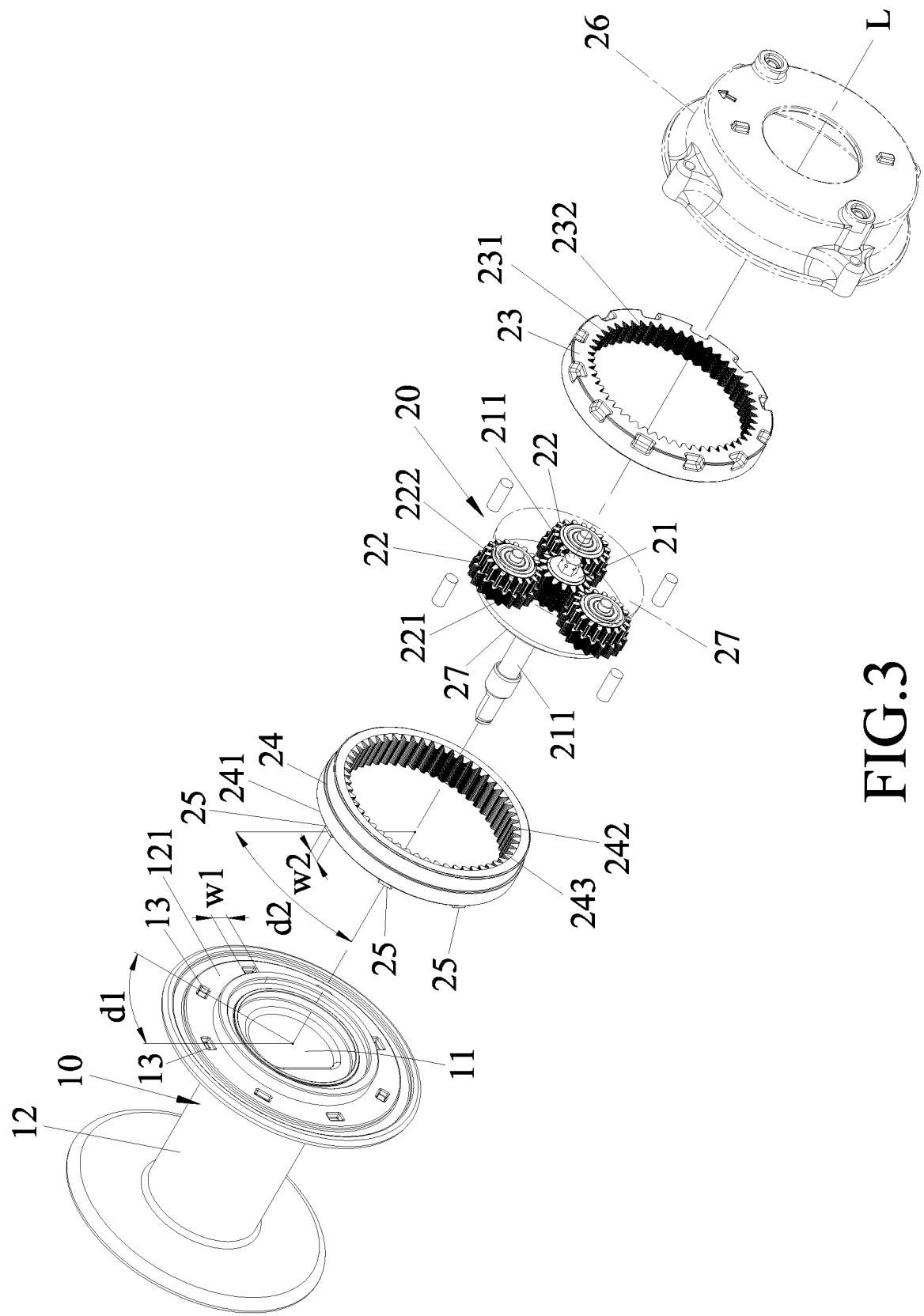
FIG. 3 is an exploded perspective view of the embodiment.

Referring to FIGS. 2 and 3, a planetary gear assembly for a planetary gear reducer mechanism of an embodiment according to the present disclosure includes a hub 10 and a planetary gear reducer mechanism 20.

Figure 4:
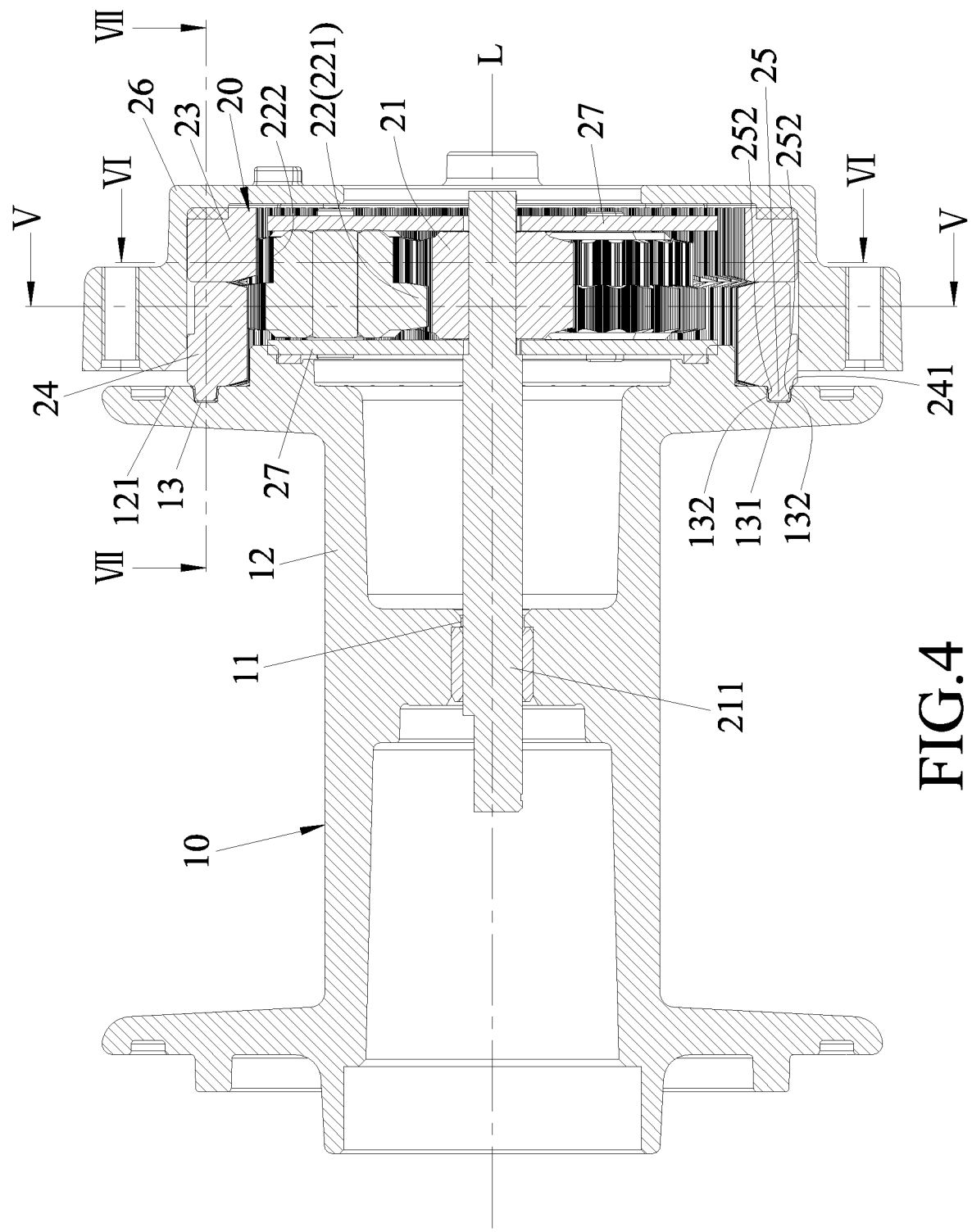
FIG. 4 is a sectional view of the embodiment.
Figure 5:
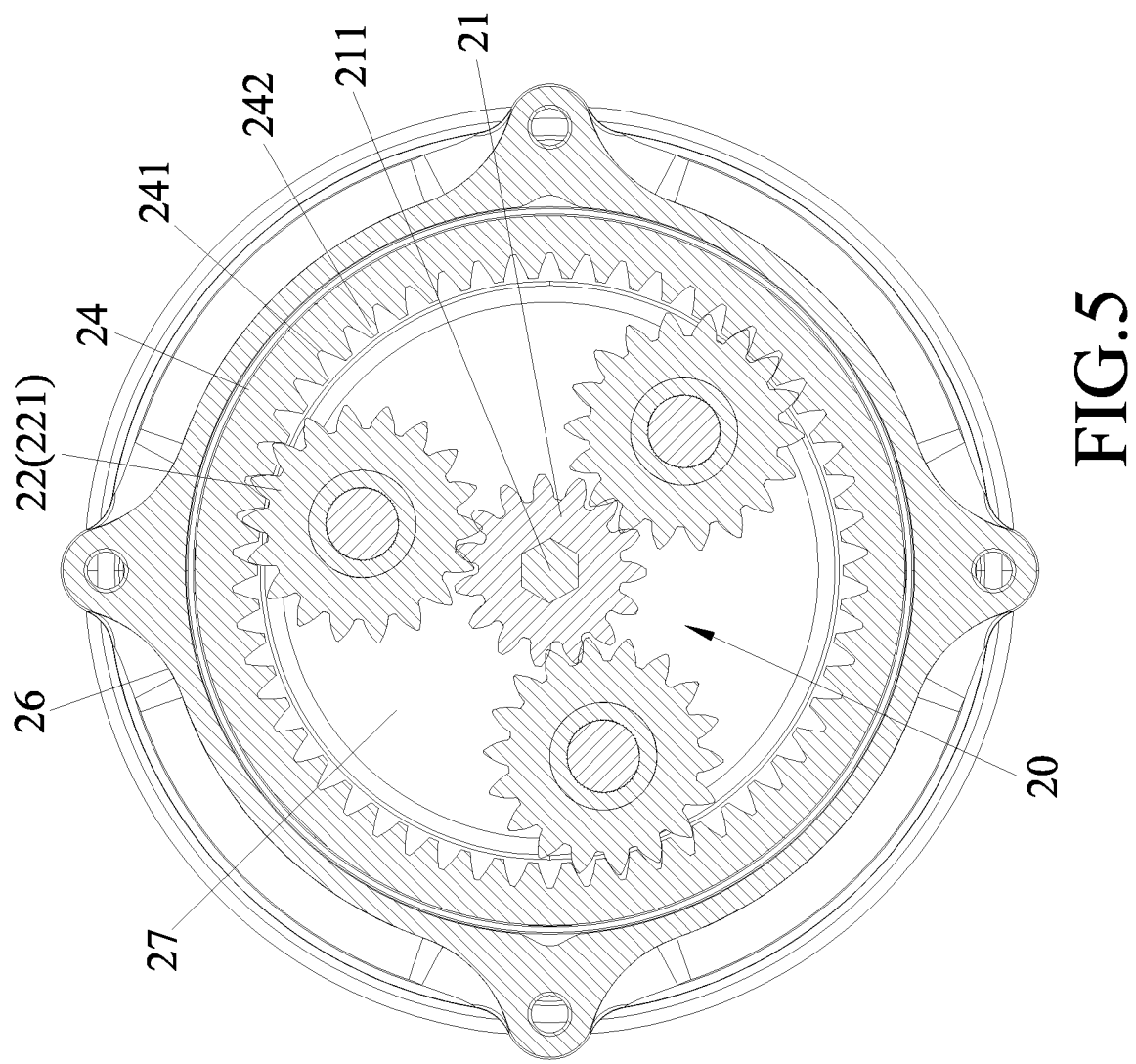
FIG. 5 is a sectional view taken along line V-V in FIG. 4.
Figure 6:
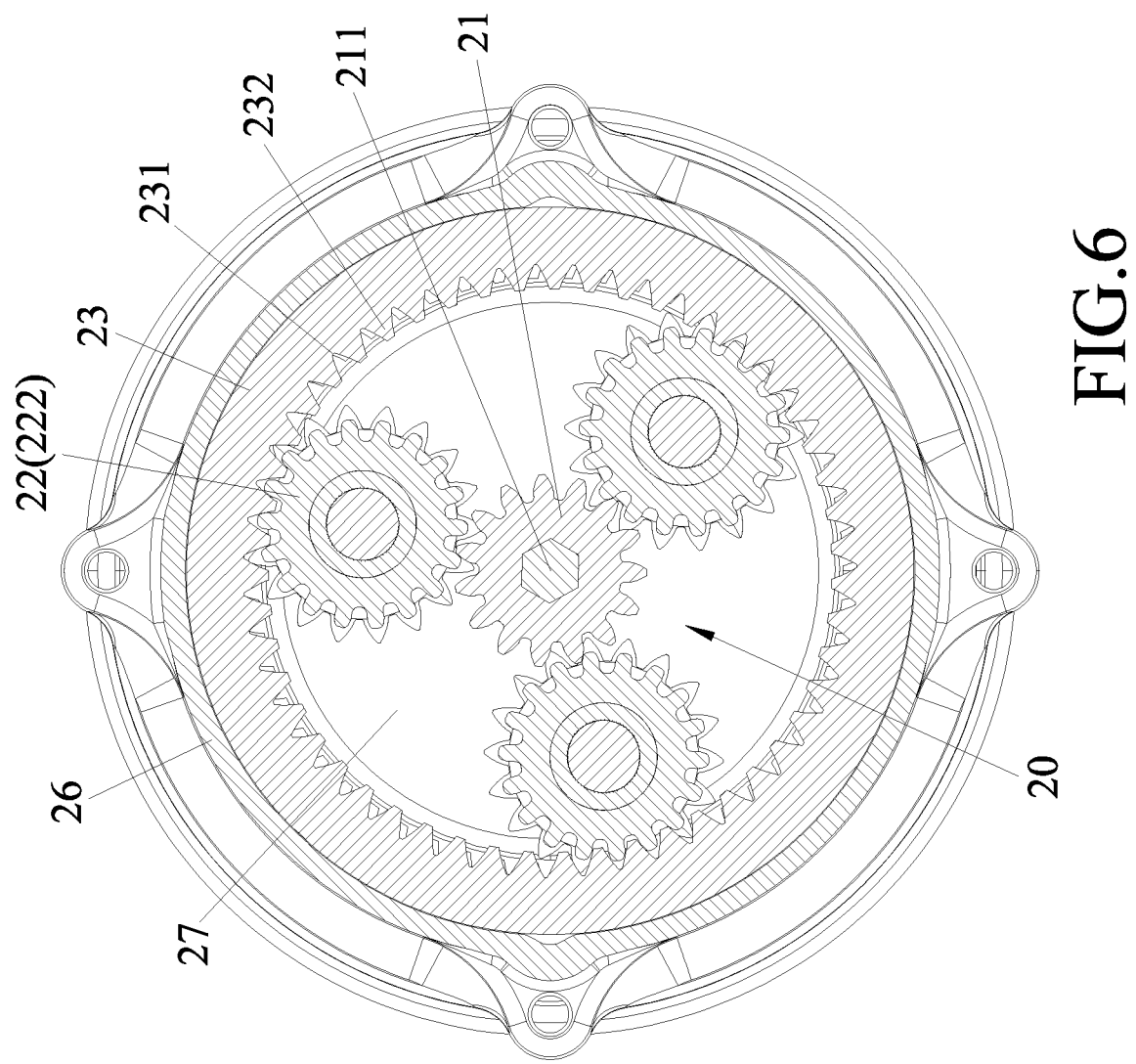
FIG. 6 is a sectional view taken along line VI-VI in FIG. 4.
Figure 7:
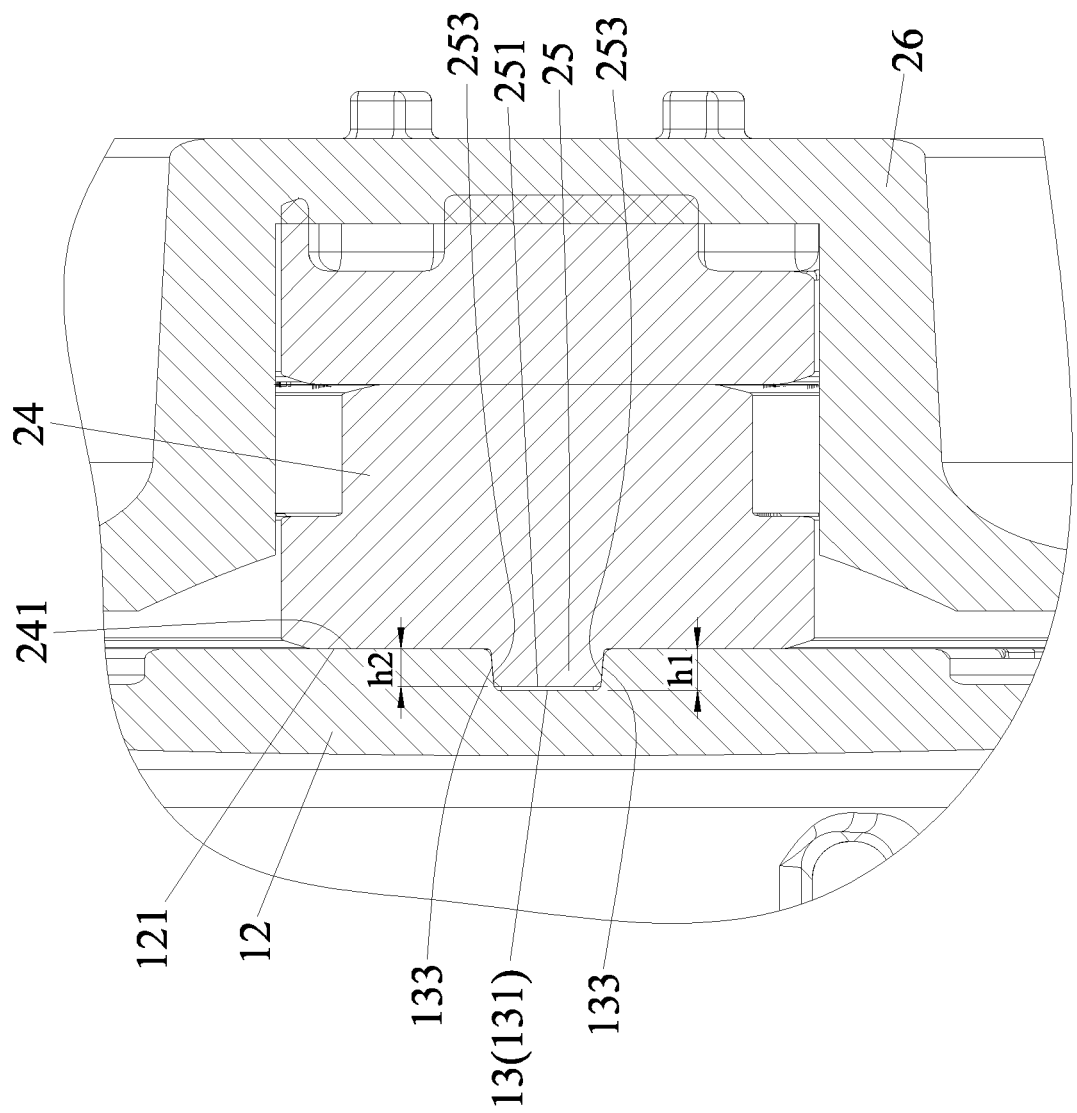
FIG. 7 is a fragmentary sectional view taken along line VII-VII in FIG. 4.

Further referring to FIGS. 4 to 6, the wheel hub 10 includes a casing 12 surrounding an axis (L) and defining an axial hole 11. The casing 12 has an end surface 121 and a plurality of engaging recesses 13 formed in the end face 121. In this embodiment, the engaging recesses 13 are recessed inwardly from the end face 121. Each of the engaging recesses 13 is defined by a base face 131 parallel to the end face 121, a pair of first recess-defining faces 132 opposite to each other and extending transversely to and connected between the base face 131 and the end face 121, and a pair of second recess-defining faces 133 opposite to each other, extending transversely to and connected between the base face 131 and the end face 121, and interconnecting the first recess-defining faces 132. As shown in FIGS. 4 and 7, the first recess-defining faces 132 of each of the engaging recesses 13 are inclined relative to the axis (L) so a distance between the first recess-defining faces 132 increases gradually from the base face 131 to the end face 121. The second recess-defining faces 133 of each of the engaging recesses 13 are inclined relative to the axis (L) so a distance between the second recess-defining faces 133 increases gradually from the base face 131 to the end face 121. For each of the engaging recesses 13, a distance (h1) is defined between the base face 131 and the end face 121 along the axis (L). The engaging recesses 13 are arranged to be angularly spaced apart from one another in a circular direction surround the axis (L), and a distance (d1) between center points of two adjacent ones of the engaging recesses 13 in the circular direction is greater than a width (w1) of each of the engaging recesses 13 in the circular direction.

The planetary gear reducer mechanism 20 includes a sun gear 21 disposed on and rotatable about the axis (L), a plurality of planet gears 22 surrounding the sun gear 21, being angularly spaced apart from each other, and meshing with the sun gear 21, a first ring gear 23 being stationary relative to and meshing with the planet gears 22, a second ring gear 24 arranged between the wheel hub 10 and the first ring gear 23 along the axis (L) and meshing with the planet gears 22, a cover 26 fixedly connected to the first ring gear 23 and being immovable relative to the wheel hub 10, and two positioning plates 27 (see FIG. 4) for mounting the sun gear 21 and the planetary gears 22 therebetween. In this embodiment, the cover 26 is connected fixedly to a vehicle (not shown).

As shown in FIG. 3, the sun gear 21 includes a shaft 211 extending along the axis (L) through the axial hole 11. In this embodiment, the shaft 211 is connected to and driven by a rear axle of the vehicle.

Each of the planetary gears 22 has a large diameter segment 221, and a small diameter segment 222 that is connected to the large diameter segment 221 and that has a diameter smaller than that of the large-diameter segment 221.

The first ring gear 23 includes a first inner surface 231 that surrounds the axis (L), and a plurality of first inward-facing teeth 232 that are arranged on the first inner surface 231 and that engage teeth of the planetary gears 22. In this embodiment, the small-diameter segment 222 of each of the planetary gears 22 meshes with the first inward-facing teeth 232.

The second ring gear 24 includes a second inner surface 242 that surrounds the axis (L), a plurality of second inward-facing teeth 243 that are arranged on the second inner surface 242 and that engage the teeth of the planet gears 22, a wheel-hub-facing face 241 that is transverse to the second inner surface 242, that surrounds the axis (L), and that faces the end face 121 of the wheel hub 10, and a plurality of joining protrusions 25 that are disposed on the wheel-hub-facing face 241 and that are respectively complementary in shape with and respectively engage the engaging recesses 13. In this embodiment, the large-diameter segment 221 of each of the planetary gears 22 meshes with the second inward-facing teeth 242.

Further referring to FIG. 7, the joining protrusions 25 are arranged to be angularly spaced apart from one another in the circular direction. A distance (d2) in the circular direction between center points of each two adjacent ones of the joining protrusions 25 is greater than a width (w2) of each of the joining protrusion 25 in the circular direction. Each of the joining protrusions 25 of the second ring gear 24 has a distal end face 251 distal from the wheel-hub-facing face 241, a pair of first side faces 252 opposite to each other and extending transversely to and connected between the distal end face 251 and the wheel-hub-facing face 241, and a pair of second side faces 253 opposite to each other, extending transversely to and connected between the distal end face 251 and the wheel-hub-facing face 241, and interconnecting the first side faces 252. In this embodiment, the first side faces 252 of each of the joining protrusions 25 are inclined relative to the axis (L) so a distance between the first side faces 252 increases gradually from the distal end face 251 to the wheel-hub-facing face 241, and the second side faces 253 of each of the joining protrusions 25 are inclined relative to the axis (L) so a distance between the second side faces 253 increases gradually from the distal end face 251 to the wheel-hub facing face 241. Each of said engaging recesses 13 is spaced apart from the respective one of the joining protrusions 25 in a direction of the axis (L). For each of the joining protrusions 25, a distance (h2) between the distal end face 251 of the respective one of the joining protrusions 25 and the wheel-hub-facing face 241 is smaller than the distance (h1) between the base face 131 of each of the engaging recesses 13 and the end face 121 of the wheel hub 10 of the respective one of the engaging recesses 13 such that a gap is formed between the base face 131 and the distal end face 251 of the respective one of the joining protrusions 25.

In order to further understand the effects provided by the embodiment, operation of the embodiment will be described in the following so a more specific understanding of this disclosure can be obtained.

After the planetary gear assembly is assembled, for each of the joining protrusions 25, the distal end face 251 faces the base face 131 of the respective one of the engaging recesses 13, the first side faces 252 face respectively the first recess-defining faces 132 of the respective one of the engaging recesses 13, and the second side faces 253 abut respectively against the second recess-defining faces 133 of the respective one of the engaging recesses 13. In this embodiment, a gap is formed between the distal end face 251 of each of the joining protrusions 25 and the base face 131 of the respective one of the engaging recesses 13 (see FIGS. 4 and 7).

As shown in FIGS. 4 to 6, when the shaft 211 of the sun gear 21 is driven to rotate, the sun gear 21 rotates about the axis (L) and drives rotation of the planetary gears 22. Since the small diameter segment 222 of each of the planetary gears 22 meshes with the first ring gear 23 that is stationary relative to the planetary gears 22, the planetary gears 22 are driven to revolve along the first inner surface 231 of the first ring gear 23. At the same time, since the large-diameter segment 221 of each of the planetary gears 22 meshes with the second ring gear 24, the second ring gear 24 co-rotates with the planetary gears 22 and drives rotation of the wheel hub 10 through connection among the engaging recesses 13 and the joining protrusions 15. In this way, speed reduction may be achieved. It should be noted that, the second ring gear 24 drives the wheel hub 10 to rotate in the circular direction, and the second side faces 253 of each of the joining protrusions 25 abut respectively against the second recess-defining faces 133 of the respective one of the engaging recesses 13 in the circular direction.

The effects provided by the embodiment of the present disclosure are summarized as follows.

First, by virtue of the joining protrusions 25 respectively engaging the engaging recesses 13, the second inner ring gear 24 drives the wheel hub 10 to simultaneously rotate therewith. Furthermore, since the second side surfaces 253 of each of the joining protrusions 25 abut respectively against the second recess-defining faces 133 of the respective one of the engaging recesses 13 in the circular direction during rotation of second inner gear 24 and the wheel hub 10, not only noises may be reduced but also wear of the second inner gear 24 and the wheel hub 10, which is resulted from collision therebetween, may be prevented.

Second, the engaging recesses 13 and the joining protrusions 25 have a relatively simple structure and are easy to manufacture, so the manufacturing cost may be reduced.

Third, by virtue of the first recess-defining faces 132 of each of the engaging recesses 13 that are inclined relative to the axis (L) so the distance between the first recess-defining faces 132 increases gradually from the base face 131 to the end face 121, and the second side faces 253 of the respective one of the joining protrusions 25 that are inclined relative to the axis (L) so the distance between the second side faces 253 increases gradually from the base face 131 to the end face 121, each of the engaging recesses 13 guides the respective one of the joining protrusion 25 to slide into and engage therewith during assembly so the planetary gear assembly may be easily assembled.

Fourth, in a case where components of the planetary gear assembly are not manufactured precisely, the gap formed between the base face 131 of each of the engaging recesses 13 and the end surface 251 of the respective one of the joining protrusions 25 serves as a margin of error so the engaging recesses 13 of the wheel hub 10 may still fittingly and respectively engage the joining protrusions 25 of the second inner ring gear 24 with a sufficient engaging strength to drive rotation of the wheel hub 10, and separation of the second inner ring gear 24 from the wheel hub 10 during the rotation may be prevented.

It should be noted that, in other embodiments, for each of the engaging recesses 13, only one of the first recess-defining faces 132 is inclined relative to the axis (L) and only one the second recess-defining faces 133 is inclined relative to the axis (L), for each of the joining protrusions 25, only one of the first side faces 252 is inclined relative to the axis (L) and only one the second side faces 253 is inclined relative to the axis (L), and the effects described above may also be achieved.

In summary, the planetary gear assembly of the present disclosure has a simple overall structure, is easy to manufacture and assemble, may reduce noises during the operation, and has a prolonged service life, so the object of the present disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A planetary gear assembly, comprising:
    a wheel hub that surrounds an axis, and that has an end face and a plurality of engaging recesses formed in said end face; and
    a planetary gear reducer mechanism that includes
        a sun gear disposed on and rotatable about the axis,
        a plurality of planet gears surrounding said sun gear, being angularly spaced apart from each other, and meshing with said sun gear,
        a first ring gear being stationary relative to and meshing with said planet gears, and including a first inner surface that surrounds the axis and a plurality of first inward-facing teeth that are arranged on said first inner surface and that engage teeth of said planetary gears, and
        a second ring gear arranged between said wheel hub and said first ring gear along the axis and meshing with said planet gears, said second ring gear including a second inner surface that surrounds the axis, a plurality of second inward-facing teeth that are arranged on said second inner surface and that engage said teeth of said planet gears, a wheel-hub-facing face that is transverse to said second inner surface, that surrounds the axis, and that faces said end face of said wheel hub, and a plurality of joining protrusions that are disposed on said wheel-hub-facing face and that are respectively complementary in shape with and respectively engage said engaging recesses.

2. The planetary gear assembly as claimed in claim 1, wherein:
    each of said engaging recesses of said wheel hub is defined by
        a base face parallel to said end face,
        a pair of first recess-defining faces opposite to each other and extending transversely to and connected between said base face and said end face, a distance between said first recess-defining faces increasing gradually from said base face to said end face, and
        a pair of second recess-defining faces opposite to each other, extending transversely to and connected between said base face and said end face, and interconnecting said first recess-defining faces; and
    each of said joining protrusions of said second ring gear has
        a distal end face distal from said wheel-hub-facing face,
        a pair of first side faces opposite to each other and extending transversely to and connected between said distal end face and said wheel-hub-facing face, a distance between said first side faces increasing gradually from said distal end face to said wheel-hub-facing face, and a pair of second side faces opposite to each other, extending transversely to and connected between said distal end face and said wheel-hub-facing face, and interconnecting said first side faces; and for each of said joining protrusions, said distal end face faces said base face of the respective one of said engaging recesses, said first side faces face respectively said first recess-defining faces of the respective one of said engaging recesses, and said second side faces abut respectively against said second recess-defining faces of the respective one of said engaging recesses.

3. The planetary gear assembly as claimed in claim 2, wherein:

for each of said engaging recesses, a distance between said second recess-defining faces increases gradually from said base face to said end face; and for each of said joining protrusions, a distance between said second side faces increases gradually from said distal end face to said wheel-hub facing face.

4. The planetary gear assembly as claimed in claim 3, wherein a distance between said base face of each of said engaging recesses and said end face of said wheel hub is greater than a distance between said distal end face of the respective one of said joining protrusions and said wheel-hub-facing face of said second ring gear such that a gap is formed between said base face of each of said engaging recesses and said distal end face of the respective one of said joining protrusions.

5. The planetary gear assembly as claimed in claim 1, wherein:

said engaging recesses are arranged to be angularly spaced apart in a circular direction surrounding the axis;

a distance in the circular direction between center points of each two adjacent ones of said engaging recesses is greater than a width of each of said engaging recesses in the circular direction;

said joining protrusions are arranged to be angularly spaced apart in the circular direction; and a distance in the circular direction between center points of each two adjacent ones of said joining protrusions is greater than a width of each of said joining protrusions in the circular direction.

* * * * *